(12) United States Patent
Mihara

(10) Patent No.: US 7,186,039 B2
(45) Date of Patent: Mar. 6, 2007

(54) IMAGING OPTICAL SYSTEM

(75) Inventor: Shinichi Mihara, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 820 days.

(21) Appl. No.: 10/444,982

(22) Filed: May 27, 2003

(65) Prior Publication Data

US 2004/0042781 A1    Mar. 4, 2004

(30) Foreign Application Priority Data

May 30, 2002    (JP)    ............................. 2002-157611

(51) Int. Cl.
*G03B 9/02* (2006.01)
*G03B 9/08* (2006.01)

(52) U.S. Cl. ...................... 396/457; 396/506; 348/340; 348/342; 348/362

(58) Field of Classification Search ................ 396/249, 396/262, 457, 506
See application file for complete search history.

(56) References Cited

U.S. PATENT DOCUMENTS 3,890,628 A * 6/1975 Gurtler ........................ 396/457
4,190,343 A * 2/1980 Wagensonner .............. 396/457
5,619,266 A * 4/1997 Tomita et al. .............. 348/363

FOREIGN PATENT DOCUMENTS

JP    06-046324    2/1994

* cited by examiner

*Primary Examiner*—W. B. Perkey
(74) *Attorney, Agent, or Firm*—Kenyon & Kenyon LLP

(57) ABSTRACT

An imaging optical system includes an image forming optical system forming an image of an object, an imaging device placed in the proximity of the image of the object, a liquid crystal element placed at a preset position on the optical path between the object and the imaging device; and an optical element placed on the object side of the liquid crystal element. The optical element is constructed of a medium in which the transmittance of light at a wavelength of 500 nm is 20% or more and which exhibits different refractive indices with respect to light, the directions of vibrations of which are perpendicular to each other.

12 Claims, 7 Drawing Sheets

IMAGING OPTICAL SYSTEM

BACKGROUND OF THE INVENTION

1. Field of the Invention

This invention relates to an improvement on the imaging system of a camera, notably a digital camera.

2. Description of Related Art

The adjustment of the amount of light in a camera is chiefly made by a combination of a shutter determining exposure time and a stop governing a numerical aperture (such as an F-number). In most cases, the amount of light is controlled by mechanically driving them.

In a shutter with mechanical drive, the simultaneity of exposure over the whole range of the aperture of the shutter itself cannot be ensured. Consequently, when the shutter is not placed in the proximity of the stop, variation of the amount of light in an image plane is caused. In a variable magnification optical system, therefore, it is necessary to move a shutter unit together with an optical system partially moved.

As shutters for fulfilling the condition of the simultaneity of exposure mentioned above, liquid crystal shutters using liquid crystals are known. The liquid crystals, however, have properties that transmittances vary greatly with the directions of vibrations of light waves.

A camera using a physical-property element that the transmittance of light or the amount of transmission of light can be controlled is disclosed in Japanese Patent Kokai No. Hei 6-46324. In this example, light is normally split in such a way that a circular polarization plate is placed on the image side of the physical-property element with the function of linear polarization, and circularly polarized light is incident on a light reflecting means placed behind the polarization plate.

In a single-lens reflex finder camera, a half mirror or a half prism is used. The purpose of this is to conduct light from the imaging optical system into a finder. That is, it is used to split the optical path. In particular, in the type that a monitor image is displayed on a liquid crystal display, it is necessary to always display the image on the liquid crystal display.

SUMMARY OF THE INVENTION

The imaging optical system according to the present invention includes an image forming optical system forming an image of an object, an imaging device placed in the proximity of the object image, a liquid crystal element placed on an optical path between the object and the imaging device, and an optical element placed on the object side of the liquid crystal element. The optical element is constructed of a medium in which the transmittance of light at a wavelength of 500 nm is 20% or more, and the medium exhibits different refractive indices with respect to light, the directions of vibrations of which are perpendicular to each other.

The imaging optical system according to the present invention has a semi-transmissive mirror for splitting the optical path between the optical element and the liquid crystal element.

These and other features and advantages of the present invention will become apparent from the following detailed description of the embodiments when taken in conjunction with the accompanying drawings.

DETAILED DESCRIPTION OF THE PREFERRED EMBODIMENTS

Figure 1:
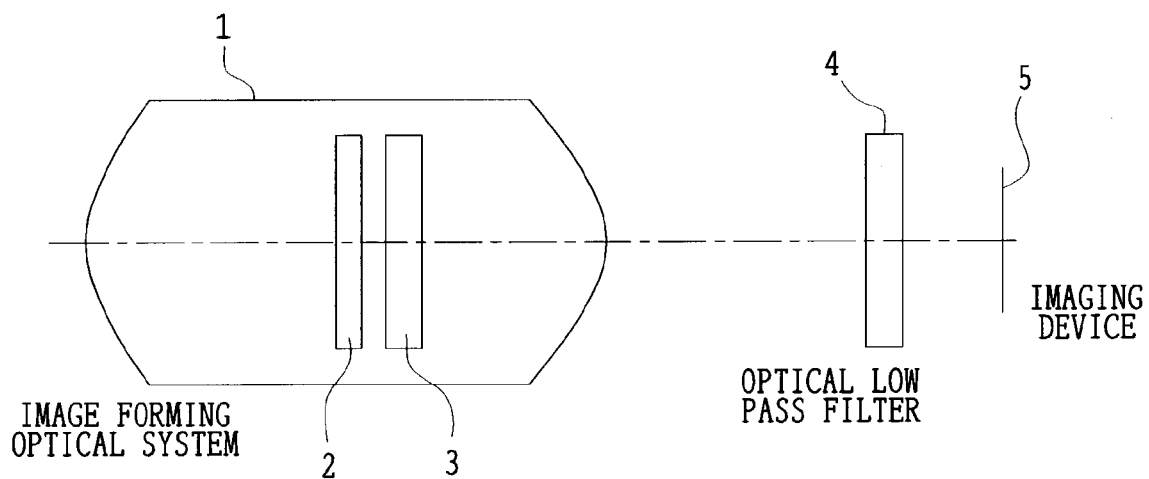
FIG. 1 is a sectional view schematically showing an optical arrangement, developed along the optical axis, in a first embodiment of the imaging optical system according to the present invention.

Before undertaking the description of the embodiments, essential points constituting the fundamental of the present invention will be explained.

According to the present invention, even though light from the object is polarized in particular directions, the extent of linear polarization can be moderated as far as possible. As a result, even when the liquid crystal element is used as the shutter, the difference between visual recognition and photography can be kept to a minimum. Here, the medium which is anisotropic with respect to the refractive index, mentioned above, is a crystal or a macromolecular substance (plastic), for instance. The optical element constructed of such a medium refers to an element that an angle $\theta$ made by the fast axis with the optical axis of the image forming optical system satisfies the following condition:

$75° \leq |\theta| \leq 90°$ (maximum and minimum possible values of $\theta$: ±90°)    (1)

The liquid crystal element is such that the adjustment of the amount of light is made as the control of the transmission time of incident light (the so-called shutter) or the control of the transmittance of incident light (the so-called aperture stop).

It is also possible to play these two roles at the same time by controlling the liquid crystal element so that the transmittance of the liquid crystal element is continuously changed.

In the single-lens reflex finder camera, notably in the type that the monitor image is displayed on the liquid crystal display, it is necessary to use the half mirror or half prism for splitting the finder optical path in order to always display the image on the liquid crystal display. However, the half prism with a reflectance of 50% has a strong function of polarization. Thus, most of light reflected by a semi-transmissive surface becomes s-polarized light, and most of light transmitted through the surface becomes p-polarized light.

According to the present invention, the optical element constructed of the medium which is anisotropic with respect to the refractive index is placed on the object side of the half prism. By doing so, the extent of linear polarization of light from the object can be moderated on the object side of the half prism. Consequently, the light can be directed toward both the reflection side and the transmission side of the half prism. An imaging device may be placed on either the transmission side or the reflection side thereof. The liquid crystal element is, of course, placed on the optical path on the imaging device side.

If the liquid crystal element is placed on the image side of the half prism and is oriented so that when p-polarized light is transmitted, the amount of this light is almost maximized, there is little loss of the amount of light due to polarization in the liquid crystal element.

The optical element constructed of the medium which is anisotropic with respect to the refractive index (such as a circular polarization plate, a quarter-wave plate, or a wave plate) has the function of circular polarization so that light is not deflected in a particular direction of polarization. Here, there are conditions for completely performing the function.

The optical element constructed of the medium which is anisotropic with respect to the refractive index has the fast axis or the slow axis (or the crystal axis in the case of the crystal). The function of circular polarization is obtained only when the orientation of the fast axis (or the slow axis) relative to the direction of polarization of incident linearly polarized light, that is, a relative azimuth between both, is 45°. In the case where the azimuth is 0° or 90°, light remains linearly polarized (however, the direction of polarization may be rotated). At azimuths other than such angles, light is elliptically polarized and is in a compromise state as the function of moderating the extent of linear polarization.

When the major axis of elliptically polarized light (its special case is circularly polarized light and linearly polarized light) makes 45° with the direction of polarization due to a linear polarizer provided on the entrance surface of the liquid crystal element, it is avoidable that light from the object does not reach the imaging plane with respect to polarized light at any azimuth. In addition, there is little difference in transmittance due to the direction of polarization of incident light. Thus, the limit of the relative azimuth bringing about a sufficient effect is expressed by the following condition:

$15° \leq |\phi| \leq 75°$ (maximum and minimum possible values of $\phi$: ±90°)    (2)

where $\phi$ is an angle made by the direction of the fast axis of the optical element constructed of the medium which is anisotropic with respect to the refractive index, with the direction of polarization due to the linear polarizer provided on the entrance surface of the liquid crystal element. Beyond the limit of this condition, the transmittance is considerably lowered, depending on the direction of polarization of the incident light, which is unfavorable.

In the optical arrangement using the semi-transmissive mirror, it is desirable that a relative azimuth relation between the semi-transmissive mirror and the liquid crystal element is as follows:

$0° \leq |\phi| \leq 30°$ (maximum and minimum possible values of $\phi$: ±90°)    (3)

where $\phi$ is an angle made by a first direction determined by a plane containing the normal line of the semi-transmissive surface of the semi-transmissive mirror and the optical axis of the image forming optical system with a second direction governed by the liquid crystal element, in which the first direction refers to the direction of a perpendicular line from the optical axis, lying in the above plane, and the second direction refers to the direction of polarization of the linear polarizer provided on the object side of the liquid crystal element. Beyond the limit of this condition, the loss of the amount of light caused by the liquid crystal element ceases to be allowable.

When an electronic image sensor is used as the imaging device, an optical low-pass filter becomes necessary. Usually, this filter is located immediately before the imaging device. However, the filter is also related with polarization. In order to normally bring about a low-pass effect, it is favorable that the relationships with the low-pass filter and the circular polarization plate, the half prism, and the liquid crystal element are established as in the following items A–D:

A. An arrangement is made, from the object side, in order of the circular polarization plate (the quarter-wave plate), the liquid crystal element, and the optical low-pass filter. Alternatively, an arrangement is made, from the object side, in order of the circular polarization plate (the quarter-wave plate), the half prism, the liquid crystal element, and the optical low-pass filter. When an angle made by the direction of separation of a ray of light due to the most object-side filter component of the optical low-pass filter with the direction of polarization of a ray of light emerging from the liquid crystal element is represented by $\alpha 1$, it is desirable to satisfy the following condition:

$$30° \leq |\alpha 1| \leq 60° \text{ (maximum and minimum possible values of } \alpha 1: \pm 90°) \tag{4}$$

It is more desirable to satisfy Conditions (1), (2), and (3).

B. The optical low-pass filter is interposed between the half prism and the liquid crystal element. When an angle made by the first direction determined by the plane containing the normal line of the semi-transmissive surface of the half prism and the optical axis of the image forming optical system with the direction of separation of ray of light due to the most object-side filter component of the optical low-pass filter is represented by $\alpha 2$, it is desirable to satisfy Condition (5) described below. Moreover, it is desirable that the liquid crystal element is placed so as to satisfy Condition (3). For this, when an angle made by the direction of separation of a ray of light due to the most image-side filter component of the optical low-pass filter with the direction of polarization of the linear polarizer on the entrance surface of the liquid crystal element is denoted by $\alpha 3$, it is desirable to satisfy Condition (6) described below.

$$30° \leq |\alpha 2| \leq 60° \text{ (maximum and minimum possible values of } \alpha 2: \pm 90°) \tag{5}$$

$$30° \leq |\alpha 3| \leq 60° \text{ (maximum and minimum possible values of } \alpha 3: \pm 90°) \tag{6}$$

Also, in the case of the circular polarization plate, it is only necessary to satisfy Conditions (1) and (2).

C. The low-pass filter is placed on the object side of the half prism. When an angle made by the first direction determined by the plane containing the normal line of the semi-transmissive surface of the half prism and the optical axis of the image forming optical system with the direction of separation of a ray of light due to the most image-side filter component of the optical low-pass filter is denoted by $\alpha 4$, it is favorable to satisfy the following condition:

$$30° \leq |\alpha 4| \leq 60° \text{ (maximum and minimum possible values of } \alpha 4: \pm 90°) \tag{7}$$

Also, it is possible that the circular polarization plate is incorporated in the optical low-pass filter as one component thereof, or the function of circular polarization is imparted to the optical low-pass filter. The optical low-pass filter may, of course, be placed on the object side of the circular polarization plate. In any case, however, it is desirable to satisfy Condition (2).

D. In an optical system in which a light-splitting element is not included, the optical low-pass filter is interposed between the circular polarization plate and the liquid crystal element. In this case, it is only necessary to satisfy Conditions (2) and (6). In addition, it is favorable to satisfy Condition (1).

In the case of an arrangement that the circular polarization plate is sandwiched between a plurality of optical low-pass filters with different directions of separation, it is desirable to satisfy Condition (6). Moreover, it is desirable to satisfy Conditions (1) and (2). However, the optical low-pass filter, when located on the object side of the circular polarization plate, is not subject to particular restriction on the azimuth relation.

In the present invention, a light-amount adjusting function corresponding to the shutter and stop of the camera is performed not by relying on the mechanical drive, but by using the physical properties of the liquid crystal, for instance. This construction is particularly effective for optical systems described below.

1. An optical system in which the shutter and the stop are moved when the magnification of the optical system is changed.

EXAMPLE 1

A zoom lens system including, in order from the object side, a first lens unit and a lens unit P with positive refracting power. A zoom lens system in which when the magnification is changed from the wide-angle position to the telephoto position, the lens unit P is moved integrally with the aperture stop toward only the object side. (In particular, an effective optical system is of the type that the first lens unit has a reflecting optical element for bending the optical path. The above construction is also effective for the optical system of the type that the lens unit P approaches the first lens unit at the telephoto position to such an extent that a member for adjusting the amount of light is not included between them.)

2. An optical system in which it is difficult to ensure space for a lens shutter mechanism in the proximity of the stop.

EXAMPLE 2

A zoom lens system including, in order from the object side, a first lens unit, a second lens unit moved when the magnification is changed, an aperture stop, and a lens unit Q moved when the magnification is changed. A zoom lens system in which when the magnification is changed from the wide-angle position to the telephoto position, at least one of the second lens unit and the lens unit Q is moved toward only one of the object side and the image side. (In this case also, an effective optical system is of the type that the first lens unit has a reflecting optical element for bending the optical path. This construction is also effective for the optical system of the type that the lens unit Q approaches the stop at the telephoto position to such an extent that a member for adjusting the amount of light is not included between them.)

3. An optical system which has the problem of dust adhesion to the image plane due to the mechanical drive of a focal-plane shutter.

EXAMPLE 3

An optical system in which a back focal distance is long as in the imaging optical system of the single-lens reflex camera. For example, an optical system for cameras satisfying a condition: Fb≧1.8·fw, where Fb is an equivalent-air medium length of a distance from the most image-side vertex of the last lens component with refracting power to the imaging plane and fw is the focal length of the zoom lens at the wide-angle position.

In the optical system of the type described in Item 1, the shutter stop with physical properties can be fixed at any proper position. By doing so, the inside diameter of the aperture stop moved when the magnification is changed can be kept constant. Consequently, the stop mechanism becomes unnecessary and a large mechanism including the shutter need not be moved. The shutter stop with physical properties need not necessarily be located in the proximity of the aperture stop as mentioned above. Therefore, the above construction is also effective for the optical system of the type that has the lens unit approaching the stop when the magnification is changed.

Examples of detailed constructions of optical systems applicable to the present invention are shown below.

1) A zoom lens which includes, in order from the object side, a first lens unit and a second lens unit with positive refracting power, performing focusing by moving the whole of the first lens unit or by moving a part of the second lens unit. Here, the first lens unit is constructed with a negative lens and a positive lens. When the magnification is changed from the wide-angle position to the telephoto position, the second lens unit is moved integrally with the aperture stop toward only the object side. The second lens unit is comprised of one or two lens components. Here, the lens component refers to a single lens or a cemented lens. Hence, a cemented triplet is also thought of as one lens component.

In the zoom lens of this example, it is desirable that the shutter stop with physical properties (a physical-property light-amount adjusting element) is fixed at any position on the image side of the second lens unit.

2) In the example of the above lens arrangement, a zoom lens having a third lens unit independent of the second lens on the image side thereof. The third lens unit includes a positive lens or a positive lens component.

In the zoom lens of this example, focusing may be performed by the third lens unit. It is desirable that the physical-property light-amount adjusting element is introduced between the second lens unit and the third lens unit, immediately behind the third lens unit, or on the image side of a last lens unit.

3) A zoom lens which includes, in order along the optical path from the object side, a first lens unit remaining fixed when the magnification is changed, a second lens unit with positive refracting power, a third lens unit moved in a different way from the second lens unit, and a last lens unit with positive refracting power. Here, the first lens unit has a negative lens whose exit surface is concave and a reflecting optical element for bending the optical path. The second lens unit is moved integrally with the aperture stop toward only the object side when the magnification is change from the wide-angle position to the telephoto position. Also, the second lens unit has one or two lens components.

In the zoom lens of this example, it is desirable that the shutter stop with physical properties (the physical-property light-amount adjusting element) is fixed between the third lens unit and the last lens unit or on the image side of the last lens unit.

4) A zoom lens which includes, in order along the optical path from the object side, a first lens unit remaining fixed when the magnification is changed, a second lens unit with negative refracting power, a third lens unit with positive refracting power, and a last lens unit with positive refracting power. Here, the first lens unit has a negative lens whose exit surface is concave and a reflecting optical element for bending the optical path. The second lens unit is moved back and forth when the magnification is changed from the wide-angle position to the telephoto position. The third lens unit is moved integrally with the aperture stop toward only the object side when the magnification is changed from the wide-angle position to the telephoto position. Also, the third lens unit has one or two lens components.

In the zoom lens of this example, it is desirable that the shutter stop with physical properties (the physical-property light-amount adjusting element) is fixed between the third lens unit and the last lens unit or on the image side of the last lens unit.

5) In the first lens unit having the reflecting optical element and remaining fixed when the magnification is changed, the reflecting optical element is the one (a prism) which has an entrance surface configured as a concave surface directed toward the object side at the most object-side position.

In the zoom lens of this example, the position of the physical-property light-amount adjusting element is the same as in Item 4).

6) A zoom lens which includes, in order form the object side, a first lens unit with positive refracting power; a second lens unit with negative refracting power, moved when the magnification is changed; an aperture stop; a lens unit Q with positive refracting power, moved when the magnification is changed; and a last lens unit R with positive refracting power. Here, the second lens unit has a positive lens at the most image-side position.

In the zoom lens of this example, it is desirable that the physical-property light-amount adjusting element is introduced between the lens unit Q and the lens unit R or on the image side of the last lens unit R. It is desirable that the second lens unit is constructed with two lens components or less.

7) A zoom lens which includes, in order from the object side, a first lens unit with positive refracting power, moved when the magnification is changed; a second lens unit with negative refracting power, moved when the magnification is changed; an aperture stop; a lens unit Q with positive refracting power, moved when the magnification is changed; and a last lens unit R with positive refracting power.

In the zoom lens of this example, it is desirable that the physical-property light-amount adjusting element is introduced between the lens unit Q and the lens unit R or on the image side of the last lens unit R.

8) A zoom lens which includes, in order along the optical path from the object side, a first lens unit remaining fixed when the magnification is changed; a second lens unit moved when the magnification is changed; an aperture stop; a lens unit Q with positive refracting power, moved when the magnification is changed; and a last lens unit R with positive refracting power. Here, the first lens unit has a negative lens whose exit surface is concave, a reflecting optical element for bending the optical path, and a positive lens. The second lens unit has a positive lens at the most image-side position.

In the zoom lens of this example, it is desirable that the physical-property light-amount adjusting element is introduced between the lens unit Q and the lens unit R or on the image side of the last lens unit R. It is desirable that the second lens unit is constructed with one or two lens components.

9) A zoom lens in which the first lens unit mentioned above is replaced with the following lens unit. This lens unit includes, in order from the object side, a reflecting optical element (a prism) which has an entrance surface configured as a concave surface directed toward the object side at the most object-side position, and a positive lens. This optical element (the prism) is provided with the function of bending the optical path.

In the zoom lens of this example, the position of the physical-property light-amount adjusting element is the same as in Item 8). The reflecting optical element for bending the optical path may also be interposed between the second lens unit and the lens unit Q.

10) An optical system in which a reflecting means for splitting the optical path is provided on the image side, or at the middle, of the entire image forming optical system.

11) An optical system which has a reflecting optical element for bending the optical path in Item 10.

12) An optical system in which the reflecting optical element in Item 11) is a prism in which at least one of an entrance surface and an exit surface is configured as a curved surface.

13) An optical system in which the reflecting means for splitting the optical path in Item 10) is a semi-transmissive mirror or a half prism. Alternatively, an optical system in which the finder is provided on the opposite side thereof.

In accordance with the drawings, the embodiments of the present invention will be explained below.

As the construction common to the embodiments mentioned below, the imaging optical system of each embodiment includes an image forming optical system forming an image of an object, an imaging device placed in the proximity of an formed image, and a liquid crystal located at any position between the object and the imaging device. In addition, the imaging optical system of each embodiment is provided with an optical element placed on the object side of the liquid crystal element. The optical element is constructed of a medium which has the transmittance of light of 20% or more at a wavelength of 500 nm and exhibits different refractive indices with respect to light waves, the directions of vibrations of which are perpendicular to each other.

The angle φ made by the direction of the fast axis of the optical element with the direction of polarization due to the linear polarizer provided on the entrance surface of the liquid crystal element is limited by Condition (2).

Some of the embodiments mentioned below are constructed so that a half mirror for splitting the optical path is provided between the optical element and the liquid crystal element.

In each embodiment having such a half mirror, the angle φ made by the first direction determined by a plane containing the normal line of the semi-transmissive surface of the half mirror and the optical axis of the image forming optical system with the second direction governed by the liquid crystal element is limited to satisfy Condition (3). Here, again, the first direction refers to the direction of a perpendicular line from the optical axis, lying in the above plane, and the second direction refers to the direction of polarization of the linear polarizer provided on the object side of the liquid crystal element.

First Embodiment

FIG. 1 shows the first embodiment of the imaging optical system according to the present invention. This embodiment is an example of the application of the present invention to the imaging optical system in which the optical path of a finder optical system and the optical path of an image forming optical system 1 are independent of each other.

In the imaging optical system, an optical element 2 and a liquid crystal element 3 are arranged inside the image forming optical system 1. Behind the image forming optical system 1, an optical low-pass filter 4 and an imaging device 5 are arranged in this order.

The optical element 2 of the first embodiment is a circular polarization plate. A quarter-wave plate is used here. Other wave plates can also be used for the circular polarization plate. Infrared cutoff coats may be applied to the air contact surfaces of the circular polarization plate. The liquid crystal element 3 has a polarizer on the side of the quarter-wave plate (the optical element 2) thereof. The direction of polarization of the polarizer makes an angle of about 45° with the direction of the crystal axis of the quarter-wave plate.

Also, although in FIG. 1 the optical element 2 is separated from the liquid crystal element 3, both may be cemented.

Second Embodiment

Figure 2:
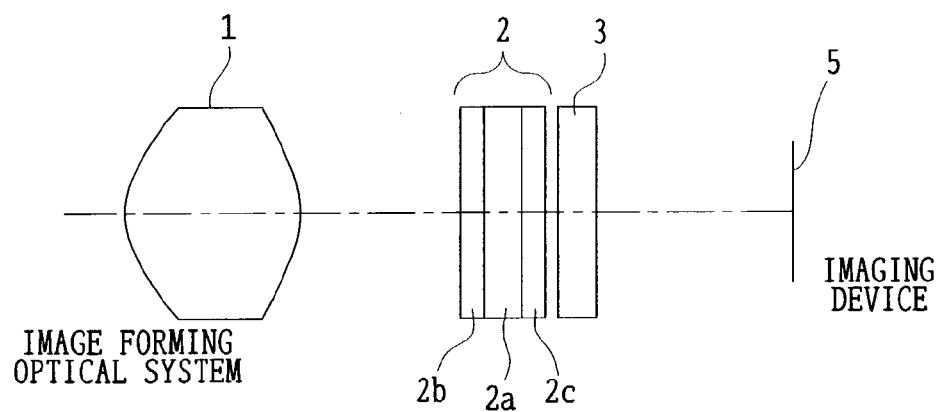
FIG. 2 is a sectional view schematically showing an optical arrangement, developed along the optical axis, in a second embodiment of the imaging optical system according to the present invention.

FIG. 2 shows the second embodiment of the imaging optical system according to the present invention. This embodiment, like the first embodiment, is also an example of the application of the present invention to the imaging optical system in which the optical path of the finder optical system and the optical path of the image forming optical system 1 are independent of each other. In the imaging optical system, the optical element 2 and the liquid crystal element 3 are arranged outside the image forming optical system 1. Behind the liquid crystal element 3, the imaging device 5 is placed.

The optical element 2 of the second embodiment includes one circular polarization plate 2a and two optical low-pass filters 2b and 2c, which are cemented to both surfaces of the circular polarization plate 2a. The quarter-wave plate is used here as the circular polarization plate 2a. Other wave plates can also be used for the circular polarization plate 2a. Infrared cutoff coats may be applied to the air contact surfaces of the optical element 2 (that is, the optical low-pass filters 2b and 2c). The liquid crystal element 3 has a polarizer on the side of the quarter-wave plate 2a thereof. The direction of polarization of the polarizer makes an angle of about 45° with the direction of the crystal axis of the quarter-wave plate 2a.

Also, although in FIG. 2 the optical element 2 is separated from the liquid crystal element 3, both may be cemented. It is also possible that the optical element 2 of the first embodiment, as in the second embodiment, is placed outside the image forming optical system 1. Conversely, the optical element 2 of the second embodiment, as in the first embodiment, can also be placed inside the image forming optical system 1.

Third Embodiment

Figure 3:
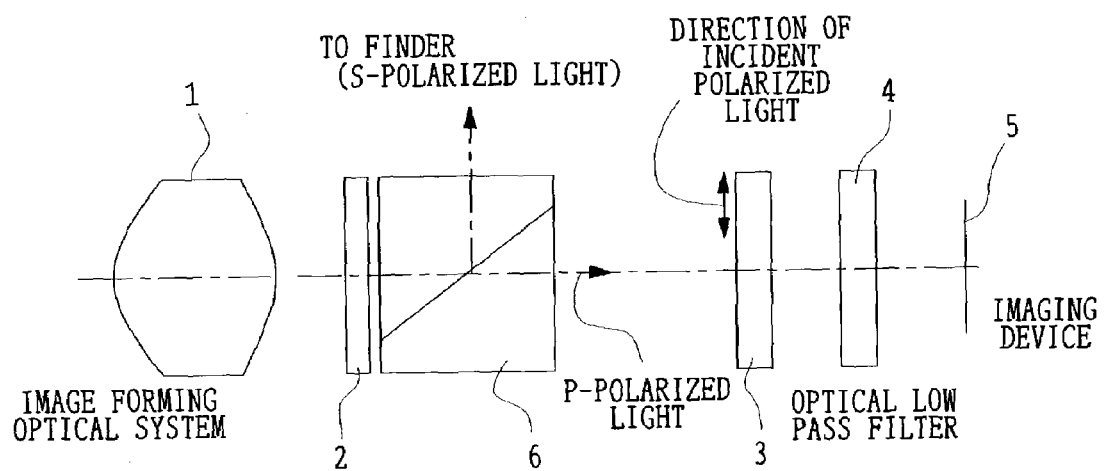
FIG. 3 is a sectional view schematically showing an optical arrangement, developed along the optical axis, in a third embodiment of the imaging optical system according to the present invention.

FIG. 3 shows the third embodiment of the imaging optical system according to the present invention. This embodiment is an example of the application of the present invention to the imaging optical system in which the optical path of the finder optical system is also used as a part of the optical path of the image forming optical system 1, for example, the imaging optical system of a single-lens reflex camera.

In the imaging optical system of the third embodiment, the optical element 2 and the liquid crystal element 3 are arranged outside the image forming optical system 1. In order to introduce the object image into the finder optical system, a half mirror (prism) 6 is placed on the optical path. The optical element 2 is the circular polarization plate and is interposed between the image forming optical system 1 and the half mirror 6. Behind the half mirror 6, the liquid crystal element 3, the optical low-pass filter 4, and the imaging device 5 are arranged in this order.

The structures of the optical element 2 and the liquid crystal element 3 in the third embodiment are the same as in the first embodiment. It is desirable that, of the polarizers of the liquid crystal element 3, the direction of polarization of the polarizer located on the side of the half mirror 6 is nearly parallel with a photographic image incident on the imaging device 5 along the optical path immediately after reflection by the half mirror 6.

Fourth Embodiment

Figure 4:
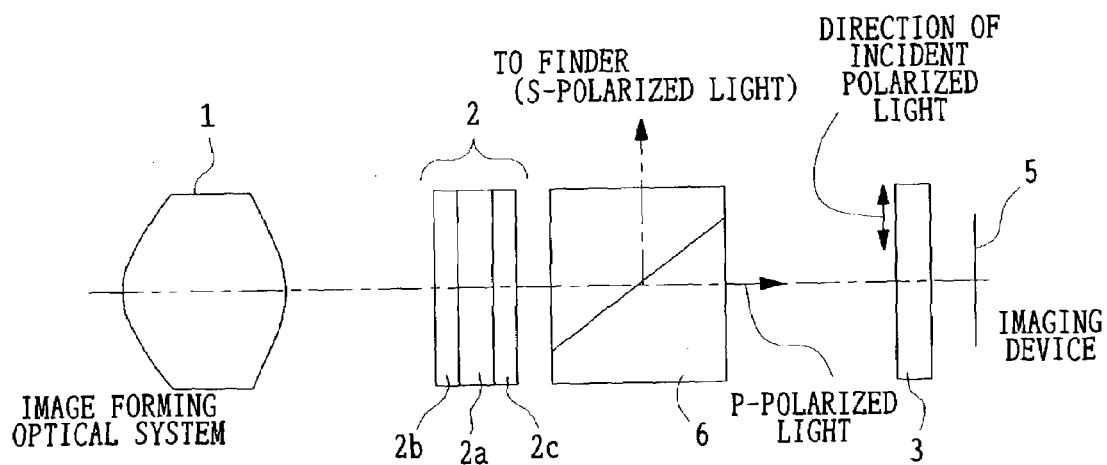
FIG. 4 is a sectional view schematically showing an optical arrangement, developed along the optical axis, in a fourth embodiment of the imaging optical system according to the present invention.

FIG. 4 shows the fourth embodiment of the imaging optical system according to the present invention. This embodiment, like the third embodiment, is an example of the application of the present invention to the imaging optical system in which the optical path of the finder optical system is also used as a part of the optical path of the image forming optical system 1, for example, the imaging optical system of a single-lens reflex camera. In the imaging optical system, the optical element 2 and the liquid crystal element 3 are arranged outside the image forming optical system 1. In order to introduce the object image into the finder optical system, the half mirror (prism) 6 is placed on the optical path. Behind the half mirror 6, the liquid crystal element 3 and the imaging device 5 are arranged in this order. The optical element 2 is the same as in the second embodiment and includes one circular polarization plate 2a and two optical low-pass filters 2b and 2c, which are cemented to both surfaces of the circular polarization plate 2a.

In the fourth embodiment, it is desirable that, of the optical low-pass filters 2b and 2c located on both sides of the optical element 2, the direction of separation of a ray of light due to the optical low-pass filter 2c on the side of the half mirror 6 makes an angle of about 45° with the photographic image incident on the imaging device 5 along the optical path immediately after reflection by the half mirror 6. It is also desirable that, of the polarizers of the liquid crystal element 3, the direction of polarization of the polarizer located on the side of the half mirror 6 is nearly parallel with the photographic image incident on the imaging device 5 along the optical path immediately after reflection by the half mirror 6.

Fifth Embodiment

Figure 5A:
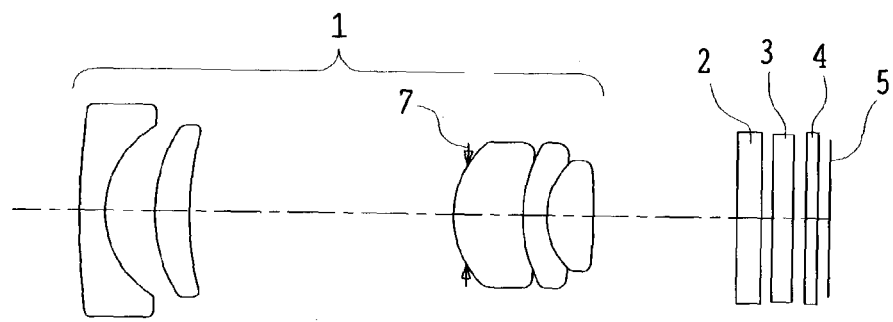
FIG. 5A is a sectional view schematically showing an optical arrangement, developed along the optical axis at a wide angle position, in a fifth embodiment of the imaging optical system according to the present invention.
Figure 5B:
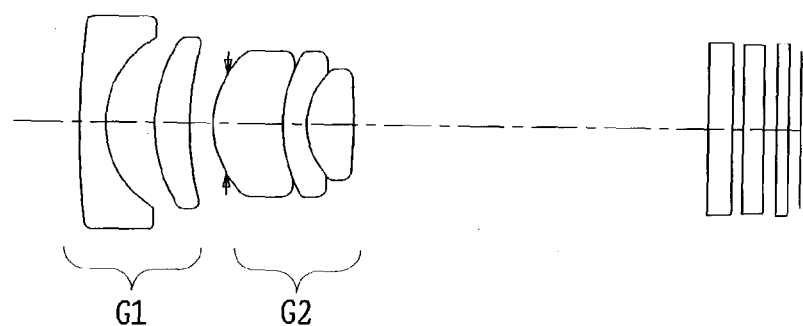
FIG. 5B is a sectional view schematically showing an optical arrangement, developed along the optical axis at a telephoto position, in the fifth embodiment of the imaging optical system according to the present invention.

FIGS. 5A and 5B illustrate the fifth embodiment of the imaging optical system according to the present invention.

The fifth embodiment is an example of the application of the present invention to the optical system in which the optical path of the finder optical system and the optical path of the image forming optical system 1 are independent of each other and an aperture stop 7 is moved when the magnification is changed. In the imaging optical system, the image forming optical system 1, the optical system 2, the liquid crystal element 3, the optical low-pass filter 4, and the imaging device 5 are arranged in a straight line. The image forming optical system 1 comprises, in order from the object side, a first lens unit G1 and a second lens unit G2 with positive refracting power, moved integrally with the aperture stop 7 toward only the object side when the magnification is changed from the wide-angle position to the telephoto position, and constitutes a zoom lens system.

The first lens unit G1 includes, in order from the object side, a negative lens and a positive lens. The second lens unit G2 is constructed with a cemented triplet.

Focusing is performed by moving the first lens unit G1 or the second lens unit G2. The optical element 2 is fixed on the image side of the second lens unit G2. The structures of the optical element 2 and the liquid crystal element 3 are same as in the first embodiment.

Sixth Embodiment

Figure 6A:
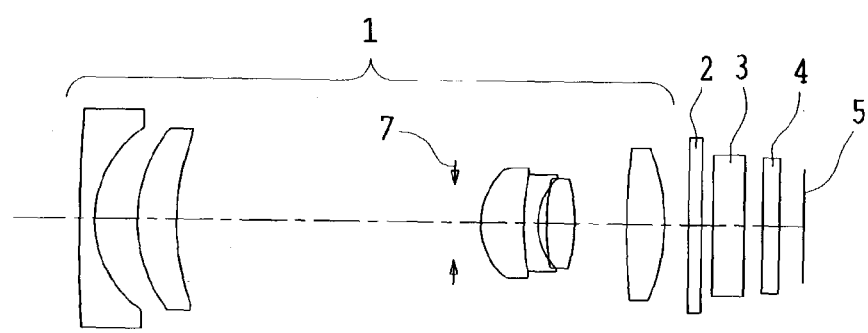
FIG. 6A is a sectional view schematically showing an optical arrangement, developed along the optical axis at the wide angle position, in a sixth embodiment of the imaging optical system according to the present invention.
Figure 6B:
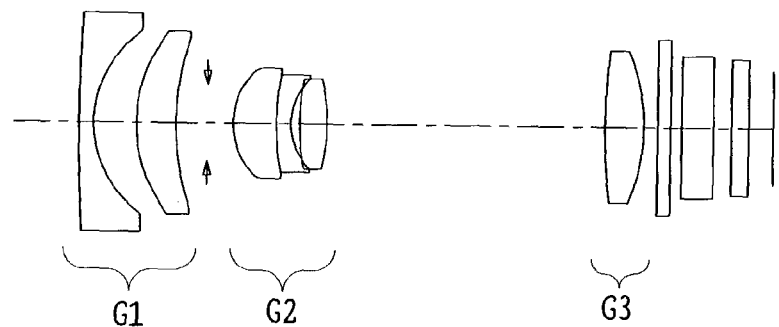
FIG. 6B is a sectional view schematically showing an optical arrangement, developed along the optical axis at the telephoto position, in the sixth embodiment of the imaging optical system according to the present invention.

FIGS. 6A and 6B illustrate the sixth embodiment of the imaging optical system according to the present invention.

This embodiment is also an example of the application of the present invention to the optical system in which the optical path of the finder optical system and the optical path of the image forming optical system 1 are independent of each other and the aperture stop 7 is moved when the magnification is changed.

In the imaging optical system of the sixth embodiment, as in the fifth embodiment, the image forming optical system 1, the optical system 2, the liquid crystal element 3, the optical low-pass filter 4, and the imaging device 5 are arranged in a straight line.

The image forming optical system 1 comprises, in order from the object side, the first lens unit G1; the second lens unit G2 with positive refracting power, moved integrally with the aperture stop 7 toward only the object side when the magnification is changed from the wide-angle position to the telephoto position; and a third lens unit G3 moved in a different way from the second lens unit G2, and constitutes a zoom lens system.

The first lens unit G1 includes, in order form the object side, a negative lens and a positive lens. The second lens unit G2 includes, in order from the object side, a cemented doublet and a positive lens. The third lens unit G3 is constructed with a single positive lens.

Focusing is performed by moving the first lens unit G1 or the second lens unit G2. The sixth embodiment is also applicable to the optical system in which focusing is performed by the third lens unit G3.

The optical element 2 is placed immediately behind the third lens unit G3. The structures of the optical element 2 and the liquid crystal element 3 are the same as in the first embodiment.

Seventh Embodiment

Figure 7A:
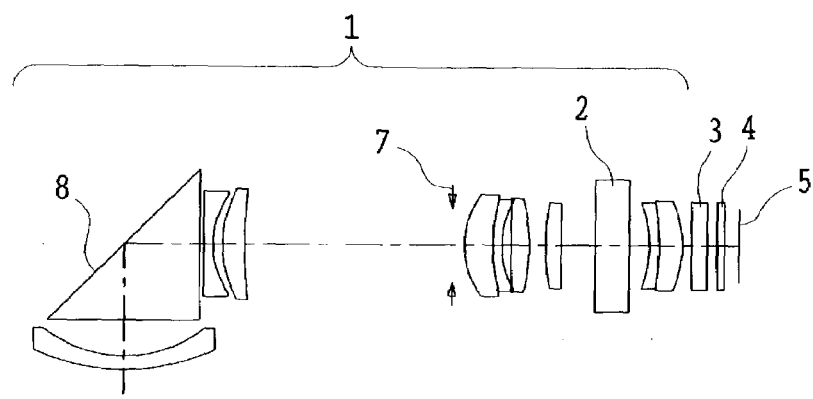
FIG. 7A is a sectional view schematically showing an optical arrangement, developed along the optical axis at the wide angle position, in a seventh embodiment of the imaging optical system according to the present invention.
Figure 7B:
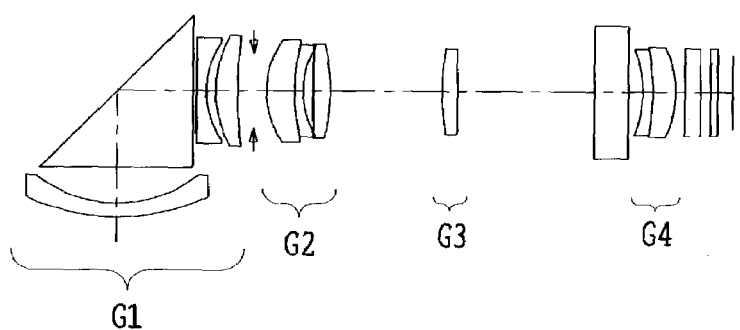
FIG. 7B is a sectional view schematically showing an optical arrangement, developed along the optical axis at the telephoto position, in the seventh embodiment of the imaging optical system according to the present invention.

FIGS. 7A and 7B show the seventh embodiment of the imaging optical system according to the present invention.

This embodiment, like the fifth and the sixth embodiments, is an example of the application of the present invention to the optical system in which the optical path of the finder optical system and the optical path of the image forming optical system 1 are independent of each other and the aperture stop 7 is moved when the magnification is changed.

The imaging optical system of the seventh embodiment constitutes a path-bending optical system and has a path-bending element 8 bending the optical axis on the optical path of the image forming optical system 1.

The image forming optical system 1 comprises, in order along the optical path from the object side, the first lens unit G1 having a negative lens whose exit surface is concave and the reflecting optical element 8 for bending the optical path by 90°, fixed when the magnification is changed; the second lens unit G2 with positive refracting power, moved integrally with the aperture stop 7 toward only the object side when the magnification is changed from the wide-angle position to the telephoto position; the third lens unit G3 moved in a different way from the second lens unit G2; and a fourth lens unit G4 with positive refracting power. The image forming optical system 1 thus constitutes a zoom lens system.

The path-bending element 8 is constructed with a prism, the entrance surface of which is flat. The second lens unit G2 includes, in order from the object side, a cemented doublet and a positive lens. The third lens unit G3 is constructed with a single positive lens. The optical element 2 is fixed between the third lens unit G3 and the fourth lens unit G4. Also, the structures of the optical element 2 and the liquid crystal element 3 are the same as in the first embodiment.

Eighth Embodiment

Figure 8A:
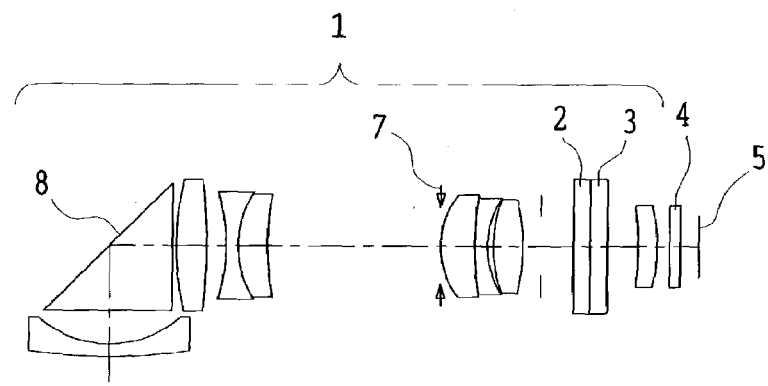
FIG. 8A is a sectional view schematically showing an optical arrangement, developed along the optical axis at the wide angle position, in an eighth embodiment of the imaging optical system according to the present invention.
Figure 8B:
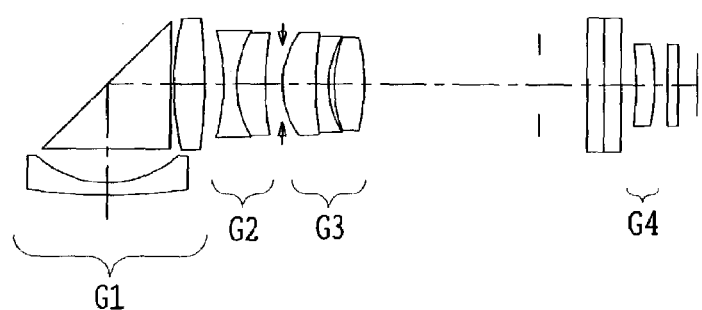
FIG. 8B is a sectional view schematically showing an optical arrangement, developed along the optical axis at the telephoto position, in the eighth embodiment of the imaging optical system according to the present invention.

FIGS. 8A and 8B show the eighth embodiment of the imaging optical system according to the present invention.

This embodiment, like the fifth to the seventh embodiments, is an example of the application of the present invention to the optical system in which the optical path of the finder optical system and the optical path of the image forming optical system 1 are independent of each other and the aperture stop 7 is moved when the magnification is changed.

The imaging optical system of the eighth embodiment, as in the seventh embodiment, constitutes the path-bending optical system and has the path-bending element 8 bending the optical axis on the optical path of the image forming optical system 1.

The image forming optical system 1 comprises, in order along the optical path from the object side, the first lens unit G1 having a negative lens whose exit surface is concave and the reflecting optical element 8 for bending the optical path by 90°, fixed when the magnification is changed; the second lens unit G2 with negative refracting power, moved back and forth when the magnification is changed from the wide-angle position to the telephoto position; the third lens unit G3 with positive refracting power, moved integrally with the aperture stop 7 toward only the object side when the magnification is changed from the wide-angle position to the telephoto position; and the fourth lens unit G4 with positive refracting power. The image forming optical system 1 thus constitutes a zoom lens system.

The path-bending element 8 is constructed with a prism, the entrance surface of which is flat. The second lens unit G2 is constructed with a cemented doublet. The third lens unit G3 includes, in order from the object side, a cemented doublet and a positive lens. The optical element 2 and the liquid crystal element 3 are fixed between the third lens unit G3 and the fourth lens unit G4. Also, in the eighth embodiment, the optical element 2 and the liquid crystal element 3 are cemented and are integrally configured.

Ninth Embodiment

Figure 9A:
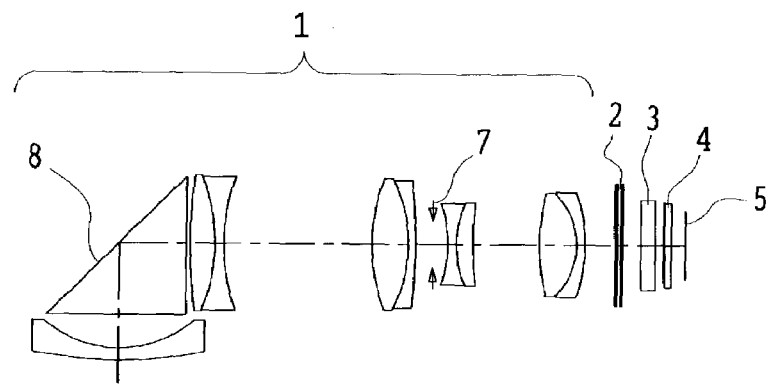
FIG. 9A is a sectional view schematically showing an optical arrangement, developed along the optical axis at the wide angle position, in a ninth embodiment of the imaging optical system according to the present invention.
Figure 9B:
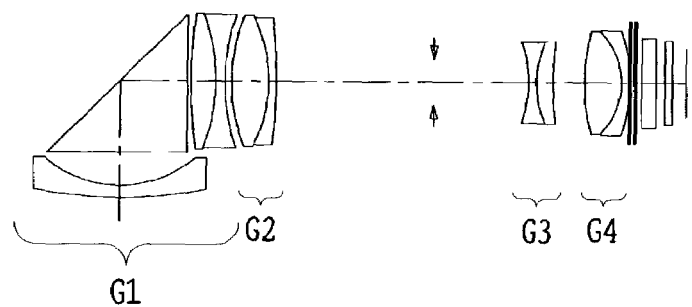
FIG. 9B is a sectional view schematically showing an optical arrangement, developed along the optical axis at the telephoto position, in the ninth embodiment of the imaging optical system according to the present invention.

FIGS. 9A and 9B show the ninth embodiment of the imaging optical system according to the present invention.

This embodiment is an example of the application of the present invention to the optical system in which the optical path of the finder optical system and the optical path of the image forming optical system 1 are independent of each other and which has, in order from the object side, the first lens unit, the second lens unit moved when the magnification is changed, the aperture stop, and the lens unit Q moved when the magnification is changed.

The imaging optical system of the ninth embodiment, as in the seventh embodiment, constitutes the path-bending optical system and has the path-bending element 8 bending the optical axis on the optical path of the image forming optical system 1.

The image forming optical system 1 comprises, in order along the optical path from the object side, the first lens unit G1 having a negative lens whose exit surface is concave and the reflecting optical element 8 for bending the optical path by 90°, fixed when the magnification is changed; the second lens unit G2 with positive refracting power, moved toward only the object side when the magnification is changed from the wide-angle position to the telephoto position; the aperture stop 7; the third lens unit G3 moved toward the image side when the magnification is changed from the wide-angle position to the telephoto position; and the fourth lens unit G4 with positive refracting power, different in the amount of movement from the third lens unit G3. The image forming optical system 1 thus constitutes a zoom lens system.

The path-bending element 8 is constructed with a prism, the entrance surface of which is flat. The second lens unit G2 is constructed with a cemented doublet. The third lens unit G3 is also constructed with a cemented doublet. The optical element 2 is placed on the image side of the fourth lens unit G4. Also, the structures of the optical element 2 and the liquid crystal element 3 are the same as in the first embodiment.

Tenth Embodiment

Figure 10A:
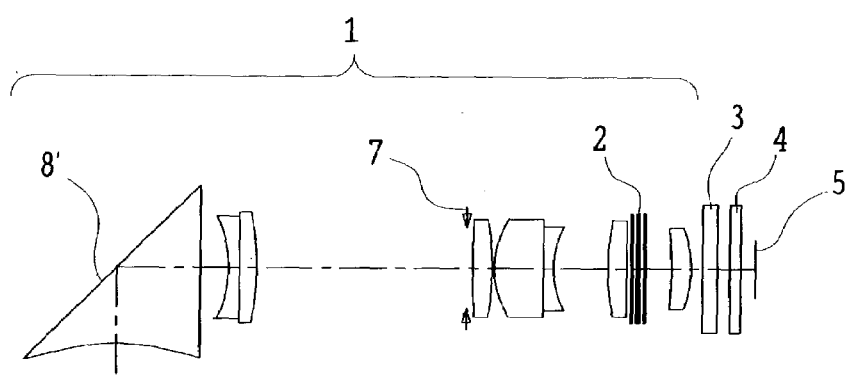
FIG. 10A is a sectional view schematically showing an optical arrangement, developed along the optical axis at the wide angle position, in a tenth embodiment of the imaging optical system according to the present invention.
Figure 10B:
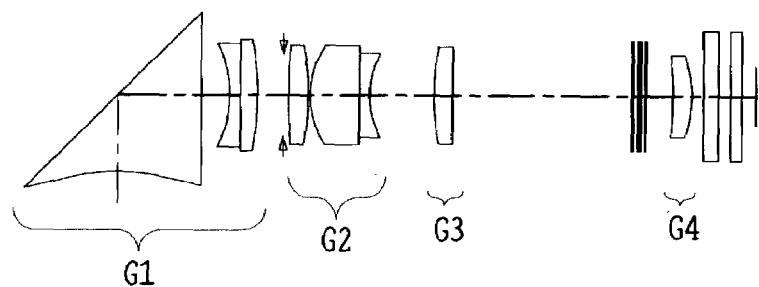
FIG. 10B is a sectional view schematically showing an optical arrangement, developed along the optical axis at the telephoto position, in the tenth embodiment of the imaging optical system according to the present invention.

FIGS. 10A and 10B show the tenth embodiment of the imaging optical system according to the present invention.

This embodiment, like the fifth to the eighth embodiments, is an example of the application of the present invention to the optical system in which the optical path of the finder optical system and the optical path of the image forming optical system 1 are independent of each other and the aperture stop 7 is moved when the magnification is changed. The imaging optical system of the tenth embodiment constitutes the path-bending optical system and has a path-bending element 8' bending the optical axis on the optical path of the image forming optical system 1.

The image forming optical system 1 comprises, in order along the optical path from the object side, the first lens unit G1 including the reflecting optical element 8' for bending the optical path by 90°, with an entrance surface configured as a concave surface directed toward the object side at the most object-side position, fixed when the magnification is changed; the second lens unit G2 with positive refracting power, moved integrally with the aperture stop 7 toward only the object side when the magnification is changed from the wide-angle position to the telephoto position; the third lens unit G3 with positive refracting power, moved toward only the object side when the magnification is changed from the wide-angle position to the telephoto position; and the fourth lens unit G4 with positive refracting power. The image forming optical system 1 thus constitutes a zoom lens system.

The path-bending element 8' is such that the entrance surface is aspherical. The second lens unit G2 includes, in order from the object side, a positive lens and a cemented doublet. The third lens unit G3 is constructed with a single positive lens. The optical element 2 is fixed between the third lens unit G3 and the fourth lens unit G4. Also, the structures of the optical element 2 and the liquid crystal element 3 are the same as in the second embodiment.

Eleventh Embodiment

Figure 11A:
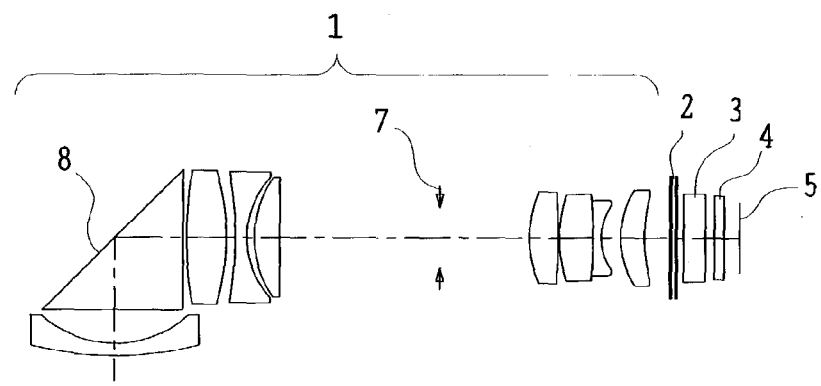
FIG. 11A is a sectional view schematically showing an optical arrangement, developed along the optical axis at the wide angle position, in an eleventh embodiment of the imaging optical system according to the present invention.
Figure 11B:
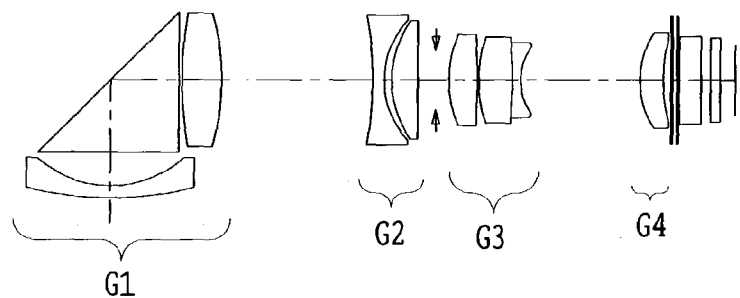
FIG. 11B is a sectional view schematically showing an optical arrangement, developed along the optical axis at the telephoto position, in the eleventh embodiment of the imaging optical system according to the present invention.

FIGS. 11A and 11B show the eleventh embodiment of the imaging optical system according to the present invention.

This embodiment, like the ninth embodiment, is an example of the application of the present invention to the optical system in which the optical path of the finder optical system and the optical path of the image forming optical system 1 are independent of each other and which has, in order from the object side, the first lens unit, the second lens unit moved when the magnification is changed, the aperture stop, and the lens unit Q moved when the magnification is changed.

The imaging optical system of the eleventh embodiment, as in the seventh embodiment, constitutes the path-bending optical system and has the path-bending element 8 bending the optical axis on the optical path of the image forming optical system 1.

The image forming optical system 1 comprises, in order along the optical path from the object side, the first lens unit G1 having a negative lens whose exit surface is concave and the reflecting optical element 8 for bending the optical path by 90°, fixed when the magnification is changed; the second lens unit G2 with negative refracting power, moved toward only the image side when the magnification is changed from the wide-angle position to the telephoto position; the aperture stop 7; the third lens unit G3 with positive refracting power, moved toward the object side when the magnification is changed from the wide-angle position to the telephoto position; and the fourth lens unit G4 with positive refracting power, different in the amount of movement from the third lens unit G3. The image forming optical system 1 thus constitutes a zoom lens system.

The path-bending element 8 is constructed with a prism, the entrance surface of which is flat. The second lens unit G2 includes, in order from the object side, a negative lens and a positive lens. The third lens unit G3 includes, in order from the object side, a positive lens and a cemented doublet. The optical element 2 is placed on the image side of the fourth lens unit G4. Also, the structures of the optical element 2 and the liquid crystal element 3 are the same as in the first embodiment.

Twelfth Embodiment

Figure 12A:
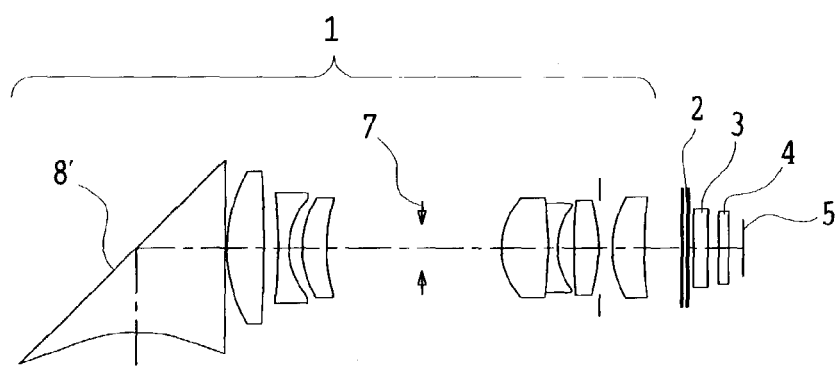
FIG. 12A is a sectional view schematically showing an optical arrangement, developed along the optical axis at the wide angle position, in a twelfth embodiment of the imaging optical system according to the present invention.
Figure 12B:
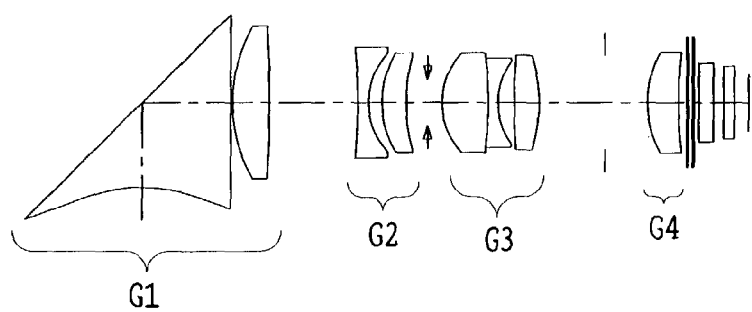
FIG. 12B is a sectional view schematically showing an optical arrangement, developed along the optical axis at the telephoto position, in the twelfth embodiment of the imaging optical system according to the present invention.

FIGS. 12A and 12B show the twelfth embodiment of the imaging optical system according to the present invention.

This embodiment, like the ninth and the eleventh embodiments, is an example of the application of the present invention to the optical system in which the optical path of the finder optical system and the optical path of the image forming optical system 1 are independent of each other and which has, in order from the object side, the first lens unit, the second lens unit moved when the magnification is changed, the aperture stop, and the lens unit Q moved when the magnification is changed.

The imaging optical system of the twelfth embodiment, as in the tenth embodiment, constitutes the path-bending optical system and has the path-bending element 8' bending the optical axis on the optical path of the image forming optical system 1. The image forming optical system 1 comprises, in order along the optical path from the object side, the first lens unit G1 including the reflecting optical element 8' for bending the optical path by 90°, with an entrance surface configured as a concave surface directed toward the object side at the most object-side position, fixed when the magnification is changed; the second lens unit G2 with negative refracting power, moved toward only the image side when the magnification is changed from the wide-angle position to the telephoto position; the aperture stop 7; the third lens unit G3 with positive refracting power, moved toward only the object side when the magnification is changed from the wide-angle position to the telephoto position; and the fourth lens unit G4 with positive refracting power, moved in a different way from the third lens unit. The image forming optical system 1 thus constitutes a zoom lens system.

The path-bending element 8' is such that the entrance surface is aspherical. The second lens unit G2 includes, in order from the object side, a negative lens and a positive lens. The third lens unit G3 includes, in order from the object side, a cemented doublet and a positive lens. The optical element 2 is placed on the image side of the fourth lens unit G4. Also, the structures of the optical element 2 and the liquid crystal element 3 are the same as in the first embodiment.

Thirteenth Embodiment

Figure 13A:
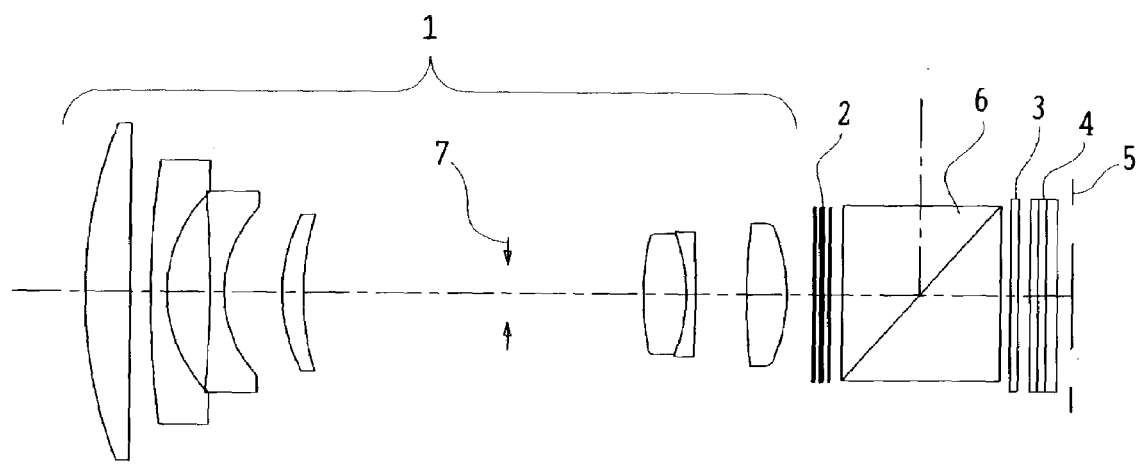
FIG. 13A is a sectional view schematically showing an optical arrangement, developed along the optical axis at the wide angle position, in a thirteenth embodiment of the imaging optical system according to the present invention.
Figure 13B:
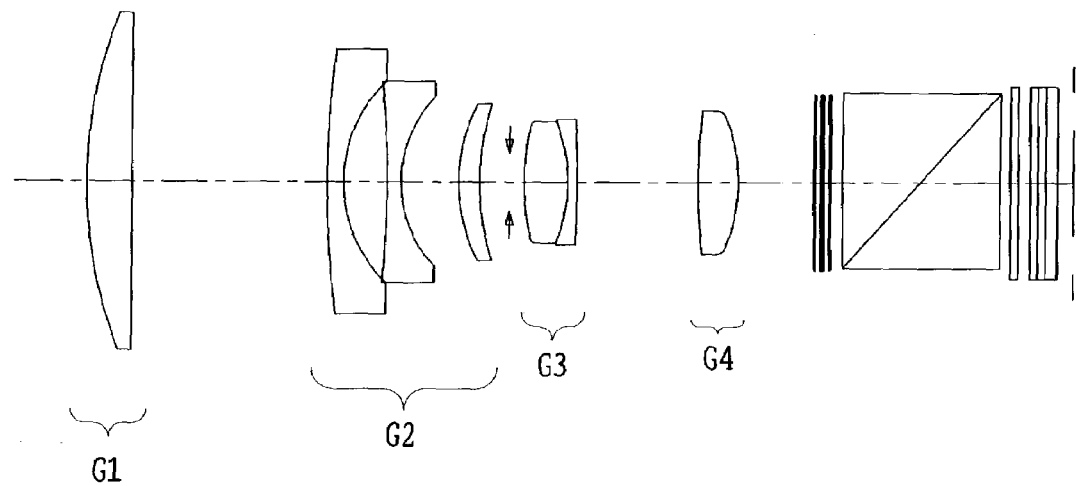
FIG. 13B is a sectional view schematically showing an optical arrangement, developed along the optical axis at the telephoto position, in the thirteenth embodiment of the imaging optical system according to the present invention.

FIGS. 13A and 13B show the thirteenth embodiment of the imaging optical system according to the present invention.

This embodiment, like the first and the third embodiments, is an example of the application of the present invention to the imaging optical system in which the optical path of the finder optical system is also used as a part of the optical path of the image forming optical system 1, for example, the imaging optical system of a single-lens reflex camera.

In the imaging optical system of the thirteenth embodiment, the image forming optical system 1, the optical element 2, the half mirror (the half prism) 6, the liquid crystal element 3, the optical low-pass filter 4, and the imaging device 5 are arranged in a straight line. The image forming optical system 1 comprises the first lens unit G1; the second lens unit G2 with negative refracting power, moved toward only the image side when the magnification is changed from the wide-angle position to the telephoto position; the aperture stop 7; the third lens unit G3 with positive refracting power, moved toward only the object side when the magnification is changed from the wide-angle position to the telephoto position; and the fourth lens unit G4 different in the amount of movement from the third lens unit G3. The image forming optical system 1 thus constitutes a zoom lens system.

The first lens unit G1 is constructed with a positive lens. The second lens unit G2 includes, in order form the object side, a negative lens, a negative lens, and a positive lens. The third lens unit G3 is constructed with a cemented doublet. The fourth lens unit G4 is constructed with a positive lens.

The half prism 6 is interposed between the optical element 2 and the liquid crystal element 3. The half prism 6 is constructed so that reflected light is conducted to the finder optical system (not shown), while transmitted light is conducted to the liquid crystal element 3. The optical element 2 is placed on the object side of the half prism 6. Also, the structures of the optical element 2 and the liquid crystal element 3 are the same as in the second embodiment.

According to the present invention, as mentioned above, a light-amount adjusting optical element in which difficulties involved in the polarization of the liquid crystal are obviated can be obtained. Whereby, the light-amount adjusting mechanism by the mechanical drive can be dispensed with.

Furthermore, since a lens barrel is simplified, a compact design can be achieved, and as a result, compactness of a camera body can be realized.

In particular, when a collapsible lens barrel is used to render the camera body slim, the present invention is effective. The collapsible lens barrel is constructed so that the optical system is shifted from the camera body in photography and is incorporated in the camera body when the camera is not used. Because of the characteristic of the optical system used in the collapsible lens barrel, at least one of lens surfaces adjacent to the aperture stop is configured as a convex surface directed toward the aperture stop. Consequently, an arrangement is made such that the inside diameter of the aperture stop is kept constant and this convex lens surface projects into the inside diameter of the aperture stop. By doing so, unnecessary space caused by the stop is completely eliminated, and moving lens units can be moved to the upmost possible limit. As a result, the thickness of the optical system where lenses are incorporated in the body can be further reduced. In this case, the stop cannot be stopped down and thus the light-amount adjusting optical element becomes necessary. However, when it is placed close to a nearly flat optical element, an increase in thickness is kept to a minimum.

Another means of reducing the depth of the camera body is to introduce the reflecting optical element bending the optical path. In this case, however, bulkiness of the lens barrel directly affects the thickness of the depth. Thus, in the optical system constructed as mentioned above, it is good practice to move the aperture stop integrally with the lens unit moved for the magnification change. This is because this practice is advantageous for optical performance. According to the present invention, however, the inside diameter of the aperture stop is kept constant. Moreover, in the light-amount adjustment, the light-amount adjusting optical element is introduced and fixed outside space for moving a variable magnification lens unit. By doing so, space for moving the light-amount adjusting mechanism can be saved, and wide compactness becomes possible.

In the optical system of a single-lens reflex type, the amount of light is reduced (to about a half) by the half mirror. Even in the light-amount adjusting optical element of the present invention, the amount of light is reduced to about a half. It may be reduced up to nearly 25% in total. However, when the optical system constructed as in the present invention is used, a reduction of the amount of light in the latter case can be avoided, and it becomes possible to ensure an amount of light of 50% as a whole.

What is claimed is:

1. An imaging optical system comprising:
   an image forming optical system forming an image of an object;
   an imaging device placed in the proximity of the image of the object formed by the image forming optical system;
   a liquid crystal element placed on an optical path between the object and the imaging device; and
   an optical element placed on an object side of the liquid crystal element,
   the optical element being constructed of a medium in which a transmittance of light at a wavelength of 500 nm is 20% or more and which exhibits different refractive indices with respect to light, directions of vibrations of which are perpendicular to each other.

2. An imaging optical system according to claim 1, satisfying the following condition:

$$15° \leq |\phi| \leq 75°$$

where $\phi$ is an angle made by a direction of a fast axis of the optical element with a direction of polarization due to a linear polarizer provided on an entrance surface of the liquid crystal element.

3. An imaging optical system according to claim 1, satisfying the following condition:

$$75° \leq |\theta| \leq 90°$$

where $\theta$ is an angle made by a direction of a fast axis of the optical element with an optical axis of the image forming optical system.

4. An imaging optical system according to claim 1, further comprising a semi-transmissive mirror for splitting the optical path interposed between the optical element and the liquid crystal element.

5. An imaging optical system according to claim 4, satisfying the following condition:

$$0° \leq |\phi| \leq 30°$$

where $\phi$ is an angle made by a first direction determined by a plane containing a normal line of a semi-transmissive surface of the semi-transmissive mirror and the optical axis of the image forming optical system with a second direction governed by the liquid crystal element, in which the first direction refers to a direction of a perpendicular line from the optical axis, lying in the above plane, and the second direction refers to the direction of polarization of the linear polarizer provided on the object side of the liquid crystal element.

6. An imaging optical system according to claim 1, further comprising an optical low-pass filter, wherein the optical element is a circular polarization plate, and the circular polarization plate, the liquid crystal element, and the optical low-pass filter are arranged in this order from the object side.

7. An imaging optical system according to claim 4, further comprising an optical low-pass filter, wherein the optical element is a circular polarization plate, and the circular polarization plate, the semi-transmissive mirror, the liquid crystal element, and the optical low-pass filter are arranged in this order from the object side.

8. An imaging optical system according to claim 6 or 7, wherein the optical low-pass filter is provided with a filter element on a most object-side surface, satisfying the following condition:

$$30° \leq |\alpha 1| \leq 60°$$

where $\alpha 1$ is an angle made by a direction of separation of a ray of light due to the filter element with a direction of polarization of a ray of light emerging from the liquid crystal element.

9. An imaging optical system according to claim 4, further comprising an optical low-pass filter interposed between the semi-transmissive mirror and the liquid crystal element to satisfy the following condition:

$$30° \leq |\alpha 2| \leq 60°$$

where $\alpha 2$ is an angle made by a first direction determined by a plane containing a normal line of a semi-transmissive surface of the semi-transmissive mirror and an optical axis of the image forming optical system with a direction of separation of a ray of light due to a most object-side filter component of the optical low-pass filter, in which the first direction refers to a direction of a perpendicular line from the optical axis, lying in the plane.

10. An imaging optical system according to claim 4, further comprising an optical low-pass filter having a filter element on a most image-side surface to satisfy the following condition:

$$30° \leq |\alpha 3| \leq 60°$$

where α3 is an angle made by a direction of separation of a ray of light due to the filter element with a direction of polarization of a linear polarizer located on an entrance surface of the liquid crystal element.

11. An imaging optical system according to claim 4, further comprising an optical low-pass filter having a filter element on a most image-side surface, placed on the object side of the semi-transmissive mirror, to satisfy the following condition:

$$30° \leq |\alpha 4| \leq 60°$$

where α4 is an angle made by a first direction determined by a plane containing a normal line of a semi-transmissive surface of the semi-transmissive mirror and an optical axis of the image forming optical system with a direction of separation of a ray of light due to the filter element on the most image-side surface, in which the first direction refers to a direction of a perpendicular line from the optical axis, lying in the plane.

12. An imaging optical system according to claim 1, further comprising an optical low-pass filter, wherein the optical element which is a circular polarization plate, the optical low-pass filter, and the liquid crystal element are arranged in this order from the object side.

* * * * *

UNITED STATES PATENT AND TRADEMARK OFFICE
CERTIFICATE OF CORRECTION

PATENT NO. : 7,186,039 B2  Page 1 of 1
APPLICATION NO. : 10/444982
DATED : March 6, 2007
INVENTOR(S) : Mihara It is certified that error appears in the above-identified patent and that said Letters Patent is hereby corrected as shown below:

Column 4, line 61, change "$0° \leq |\varphi| \leq 30°$" to -- $0° \leq |\psi| \leq 30°$ --;

Column 4, line 62, change "values of $\varphi : \pm 90°$" to -- values of $\psi : \pm 90°$ --;

Column 4, line 64, change "where $\varphi$ is an angle" to -- where $\psi$ is an angle --;

Column 18, line 20, change "$0° \leq |\varphi| \leq 30°$" to -- $0° \leq |\psi| \leq 30°$ --; and Column 18, line 21, change "where $\varphi$ is an angle" to -- where $\psi$ is an angle --.

Signed and Sealed this

Nineteenth Day of August, 2008

JON W. DUDAS
*Director of the United States Patent and Trademark Office*